US012068528B2

(12) United States Patent
Harper et al.

(10) Patent No.: US 12,068,528 B2
(45) Date of Patent: Aug. 20, 2024

(54) PARASITIC ANTENNA COUPLING IN A PHYSICALLY CONFIGURABLE COMMUNICATION DEVICE

(71) Applicant: Microsoft Technology Licensing, LLC, Redmond, WA (US)

(72) Inventors: Marc Harper, Snohomish, WA (US); Chulmin Han, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 17/355,556

(22) Filed: Jun. 23, 2021

(65) Prior Publication Data

US 2022/0416404 A1 Dec. 29, 2022

(51) Int. Cl.

*H01Q 5/378* (2015.01)
*H01Q 1/24* (2006.01)
*H01Q 21/00* (2006.01)

(52) U.S. Cl.

CPC ......... *H01Q 1/243* (2013.01); *H01Q 21/0025* (2013.01)

(58) Field of Classification Search

CPC ... H01Q 1/243; H01Q 1/2258; H01Q 21/0025
See application file for complete search history.

(56) References Cited

U.S. PATENT DOCUMENTS

2022/0223999 A1* 7/2022 Wu .......................... H01Q 1/42

FOREIGN PATENT DOCUMENTS

| | | | |
|---|---|---|---|
| CN | 112701452 | A | 4/2021 |
| WO | 2020134958 | A1 | 7/2020 |
| WO | 2020168926 | A1 | 8/2020 |
| WO | 2020228703 | A1 | 11/2020 |

OTHER PUBLICATIONS

"International Search Report and Written Opinion Issued in PCT Application No. PCT/US22/029511", Mailed Date: Aug. 29, 2022, 11 Pages.

* cited by examiner

*Primary Examiner* — Henry Luong
(74) *Attorney, Agent, or Firm* — Holzer Patel Drennan

(57) ABSTRACT

A physically configurable communication device includes a conductive chassis. The physically configurable communication device includes a first device portion including one or more electrically driven antennas at least partially formed in the conductive chassis of the physically configurable communication device and an electrical feed in the first device portion connected to the one or more electrically driven antennas. The electrical feed is configured to supply a communication signal to the one or more electrically driven antennas. A second device portion is movably attached to the first device portion. The second device portion includes one or more capacitively coupled antennas at least partially formed in the conductive chassis of the physically configurable communication device, wherein each of the electrically driven antennas in the first device portion capacitively drives at least a corresponding one of the capacitively coupled antennas in the second device portion.

21 Claims, 6 Drawing Sheets

PARASITIC ANTENNA COUPLING IN A PHYSICALLY CONFIGURABLE COMMUNICATION DEVICE

BACKGROUND

A foldable communication device (e.g., a foldable mobile computing device with multiple displays) can provide wireless communication functionality using antennas placed within the device. Such devices can be used in different physical configurations (e.g., folded closed, unfolded into a laptop or tablet mode, folded wide open so that the "backs" of the displays are folded against each other).

SUMMARY

The described technology provides a physically configurable communication device having a conductive chassis. The physically configurable communication device includes a first device portion including one or more electrically driven antennas at least partially formed in the conductive chassis of the physically configurable communication device and an electrical feed in the first device portion connected to the one or more electrically driven antennas. The electrical feed is configured to supply a communication signal to the one or more electrically driven antennas. A second device portion is movably attached to the first device portion. The second device portion includes one or more capacitively coupled antennas at least partially formed in the conductive chassis of the physically configurable communication device, wherein each of the electrically driven antennas in the first device portion capacitively drives at least a corresponding one of the capacitively coupled antennas in the second device portion.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
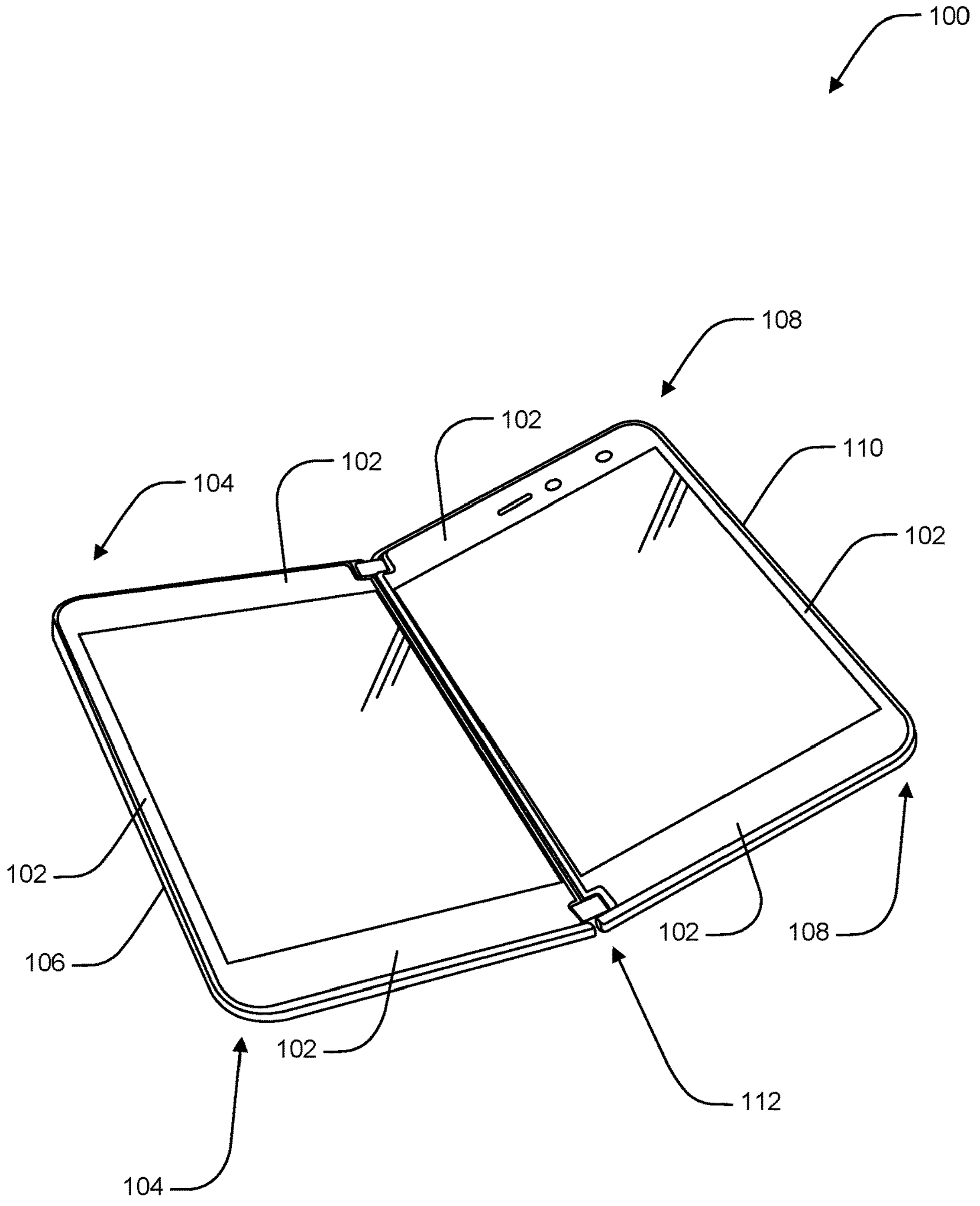
FIG. 1 illustrates an example foldable communication device.

Foldable communication devices present challenges in antenna design. For example, an example foldable communication device may include two device portions separated by a hinge, although additional device portions that move relative to each other may also be employed. Each portion can include a display to allow different physical configurations for operation. In a first example physical configuration, referred to as "folded closed" mode, the device portions are folded such that the displays are facing each other. In a second example physical configuration, referred to as "laptop" mode, the device portions are unfolded to such an extent that the displays are positioned similar to a laptop computer, with one display positioned upright like a laptop display and the other display positioned to face upward like a keyboard of a laptop computer. In a third example physical configuration, referred to as "tablet" mode, the device portions are unfolded to such an extent that the displays are positioned similar to a tablet computer, with both displays opened to substantially flat positions relative to each other. In a fourth example physical configuration, referred to as "folded open" or "phone" mode, the device portions are folded such that the backs of the device portions are facing each other (i.e., the displays facing away from each other). Other physical configurations may also be employed.

In addition to foldable communication devices, other physical configurable devices may also benefit from the described technology. For example, instead of folding, two device portions may slide relative to each other (e.g., sliding together into a phone mode or sliding apart into a tablet mode). The device portions in such a physically configurable device may be movably attached by hinges, sliders, sliding brackets, etc. to allow the relative movement of the device portions for changing the physical configuration of the device. Other physical configurations may also be employed. Accordingly, the parasitic antenna coupling approach described herein provides for increasing the electrical aperture of the electrically driven antenna across multiple device portions without bridging an RF cable across such movable attachments.

Each of these physical positions can impact the wireless performance of the device. For example, folding the device portions can change the electrical size of the ground plane and, therefore, can change the impedance tuning to the various antennas on the communication device. In addition, the different physical configurations can present different coupling and tuning conditions experienced by the various antennas.

In addition, industrial designers continue to push for exterior metal device chassis and for reductions in bezel (the region between the display edge and the device portion edge) sizes. Smaller bezels tend to reduce antenna size and, therefore, antenna performance. Nevertheless, distributing antennas among multiple bezels and/or device edges can address both industrial design considerations while obtaining acceptable antenna performance. However, bridging a radio frequency cable across a hinge between two device portions of a foldable communication device to electrically drive antennas in both device portions can be challenging, impractical, or impossible. In particular, antennas in the cellular (e.g., 5G, 4G) and/or Wi-Fi frequency bands suffer from detuning and diminished performance in the "folded closed" and "folded open" modes.

Accordingly, in various implementations of the described technology, electrically driven antennas are positioned in one device portion, and capacitively coupled antennas are positioned in another device portion in such an overlapping configuration as to allow the electrically driven antennas to capacitively drive the capacitively coupled antennas (e.g., parasitic antennas) while the device portions are folded against (or proximate to) each other. In this manner, the electrically driven antennas (e.g., in cellular and/or Wi-Fi frequency bands) can capacitively drive the capacitively coupled antennas to re-radiate the electrically driven carrier signal through the capacitively coupled antennas (e.g., increasing the electrical aperture of the electrically driven antenna). The capacitively coupled antennas can be selectively tuned to accommodate the detuning effects of the different physical configurations.

FIG. 1 illustrates an example foldable communication device 100. The foldable communication device 100 is contained within a conductive device chassis (e.g., an exterior metal case), such that a substantial area of the thin edges of the device portions is conductive/metal. The foldable communication device 100 is shown as unfolded almost into a flat tablet mode. The bezels 102 are shown at varying widths. The electrically driven antennas 104 are positioned on a device portion 106, and capacitively coupled antennas 108 are positioned on a device portion 110, although other positions on either or both device portions are contemplated. In at least one implementation, each antenna forms a section of edges on the exterior metal case, although other implementations are contemplated. The device portion 106 and the device portion 110 are movably attached by a hinge 112.

While the foldable communication device 100 is folded open or closed, such that electrically driven antennas 104 in the device portion 106 are in proximity to and substantially overlapping the capacitively coupled antennas 108 in the device portion 110, radiofrequency energy from the electrically driven antennas 104 couples with the capacitively coupled antennas 108 so that both sets of antennas are radiating a carrier signal in a select frequency band. In contrast, while the foldable communication device 100 is unfolded into a tablet or laptop mode, such that electrically driven antennas 104 in the device portion 106 are not in sufficient proximity to the capacitively coupled antennas 108 in the device portion 110 to capacitively drive the capacitively coupled antennas 108 with radiofrequency energy from the electrically driven antennas 104. In at least one implementation, the use of the capacitively coupled antennas 108, rather than electrically driven antennas, in the device portion 110 eliminates or reduces a need to bridge a radio frequency cable across the hinge 112 to electrically drive electrically driven antennas in the device portion 110.

Figure 2:
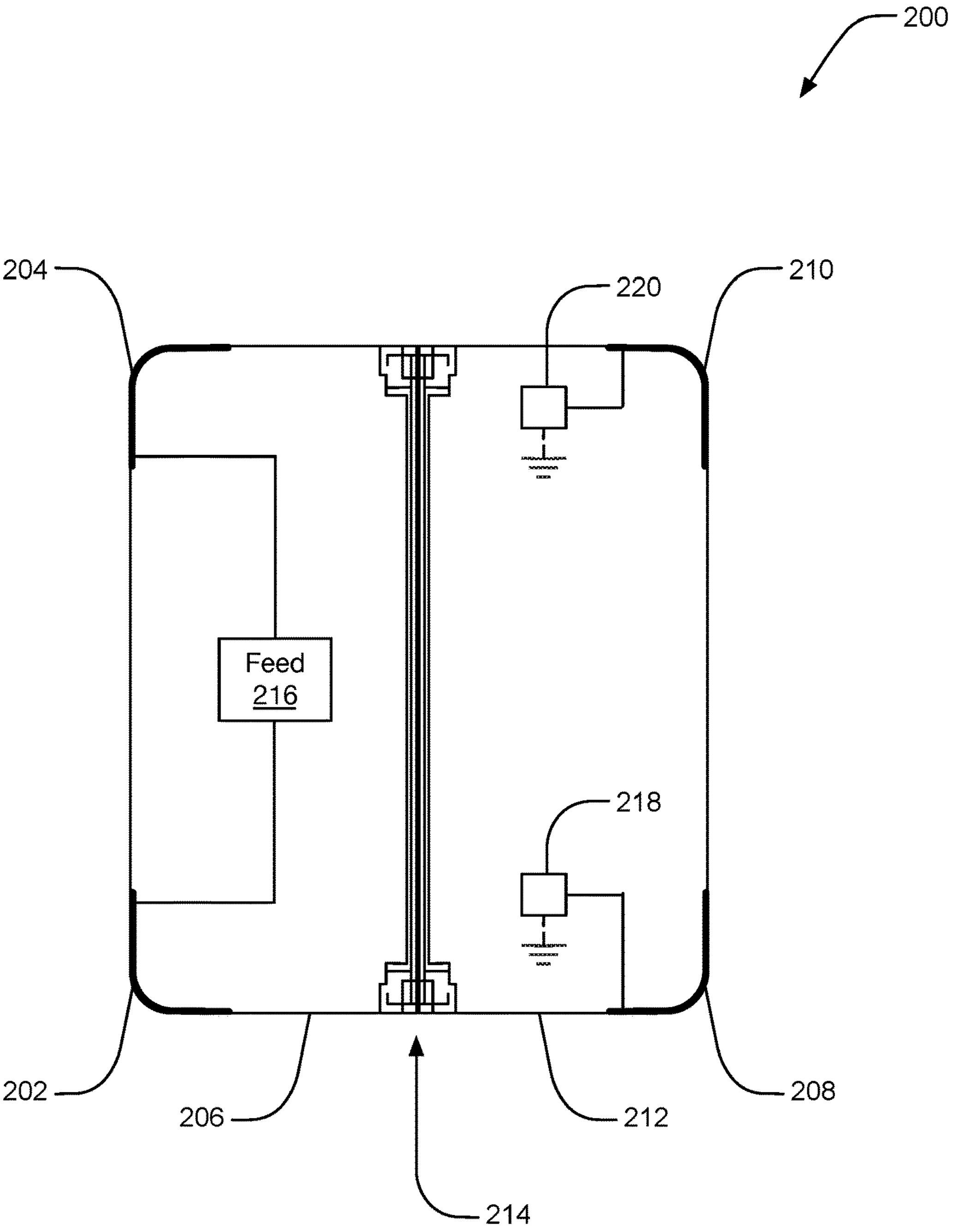
FIG. 2 illustrates elements of an example foldable communication device.

FIG. 2 illustrates elements of an example foldable communication device 200. The foldable communication device 200 is contained within a conductive device chassis (e.g., an exterior metal case), such that substantial areas of the thin edges of the device portions are conductive/metal. The foldable communication device 200 is shown as unfolded into a flat tablet mode. The electrically driven antennas 202 and 204 (shown as bolded lines) are positioned on a device portion 206, and capacitively coupled antennas 208 and 210 (shown as bolded lines) are positioned on a device portion 212, although other positions on either or both device portions are contemplated. In at least one implementation, each antenna forms a section of edges on the exterior metal case, although other implementations are contemplated. Each antenna formed from the exterior metal case may be electrically separated from other antennas and other sections of the exterior metal case, such as by dielectric inserts or gaskets. The device portion 206 and the device portion 212 are movably attached by a hinge 214.

The electrically driven antennas 202 and 204 are electrically driven by a feed 216, which may include multiple individual antenna feeds (e.g., one for each electrically drive antenna). The electrically driven antennas 202 and 204 radiate radio frequency energy in a select frequency band (e.g., a 4G or 5G frequency band, a Wi-Fi frequency band). It should be understood that the electrically driven antennas 202 and 204 can be configured to radiate in different frequency bands (e.g., one in a 5G frequency band and the other in a Wi-Fi frequency band).

While the foldable communication device 200 is folded open or closed, such that electrically driven antennas 202 and 204 in the device portion 206 are in proximity to and substantially overlapping the capacitively coupled antennas 208 and 210, respectively, in the device portion 212, radiofrequency energy from the electrically driven antennas 202 and 202 couples with the capacitively coupled antennas 208 and 210 so that both sets of antennas are radiating a carrier signal in a select frequency band. In contrast, while the foldable communication device 200 is unfolded into a tablet or laptop mode, such that electrically driven antennas 202 and 204 in the device portion 206 are not in sufficient proximity to the capacitively coupled antennas 208 and 210 in the device portion 212 to capacitively drive the capacitively coupled antennas 208 and 210 with radiofrequency energy from the electrically driven antennas 202 and 204. In at least one implementation, the use of the capacitively coupled antennas 208 and 210, rather than electrically driven antennas, in the device portion 212 eliminates or reduces a need to bridge a radio frequency cable across the hinge 214 to electrically drive electrically driven antennas in the device portion 212.

As the foldable communications device 200 changes between modes (e.g., physical configurations), changes in the coupling, shielding, and/or electrical size of the ground plane can change the tuning of the capacitively coupled antennas 208 and 210. Accordingly, a variable impedance element 218 is connected to the capacitively coupled antenna 208, and a variable impedance element 220 is connected to the capacitively coupled antenna 210. In one implementation, a variable impedance element may include a switched inductance network, a variable capacitor, and/or a variable resistor or switched resistance network, although other combinations of variable impedance elements may be employed.

Figure 6:
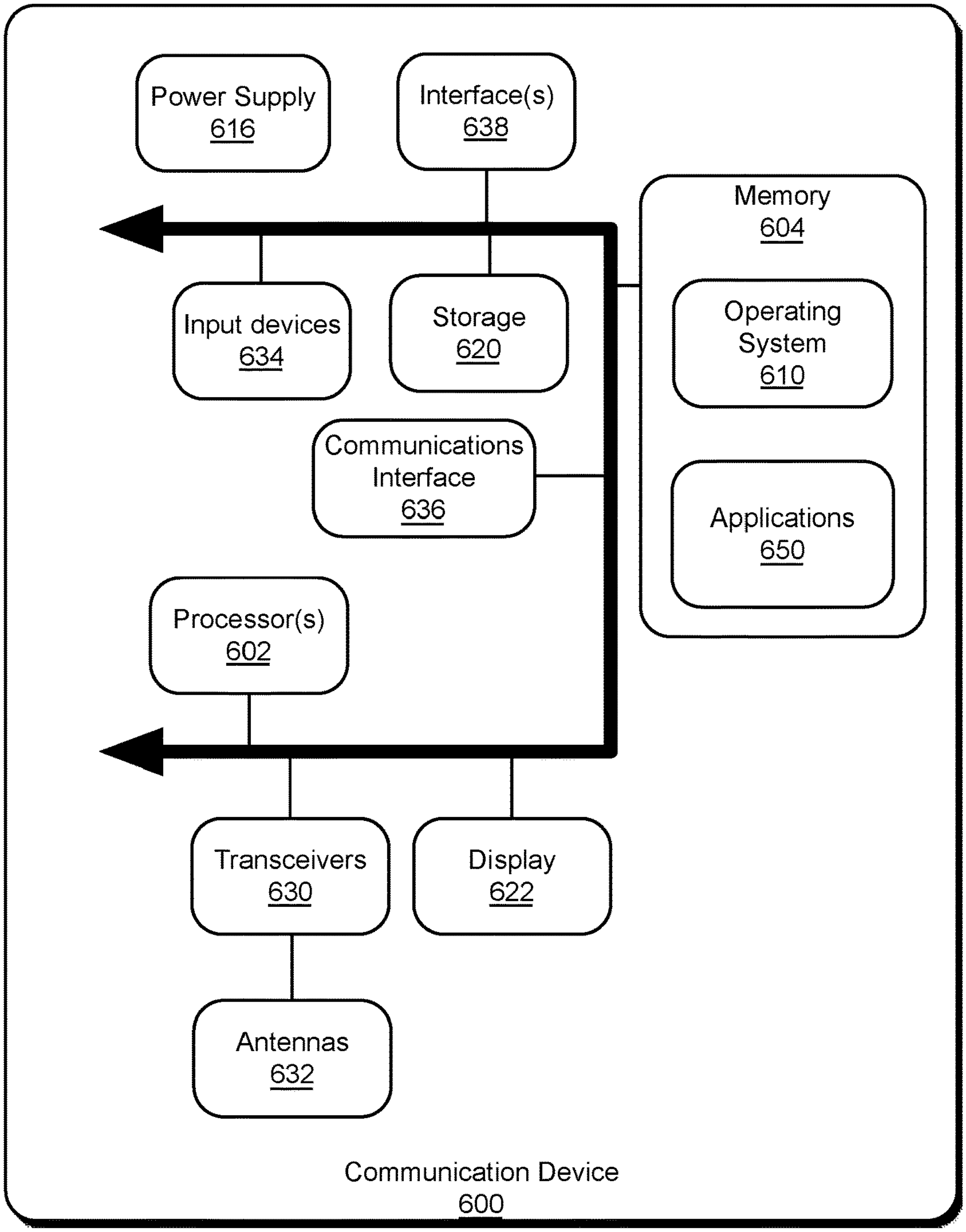
FIG. 6 illustrates exampled hardware and software that can be useful in implementing the described technology.

Variations in the impedance may be controlled mechanically, electrically, and/or by software (such as software executed by one or more processing units of a communication device, such as illustrated and described with regard to FIG. 6). In one implementation, the impedance is adjusted to tune the electrically coupled antennas based at least in part by the rotation of the hinge, based at least in part by feedback from sensors (e.g., gyros, accelerometers), etc. In addition, impedance tuning can work with a posture detection feature (e.g., physical configuration detection feature) and can be tuned accordingly to yield optimal RF performance for different physical configurations.

Figure 3:
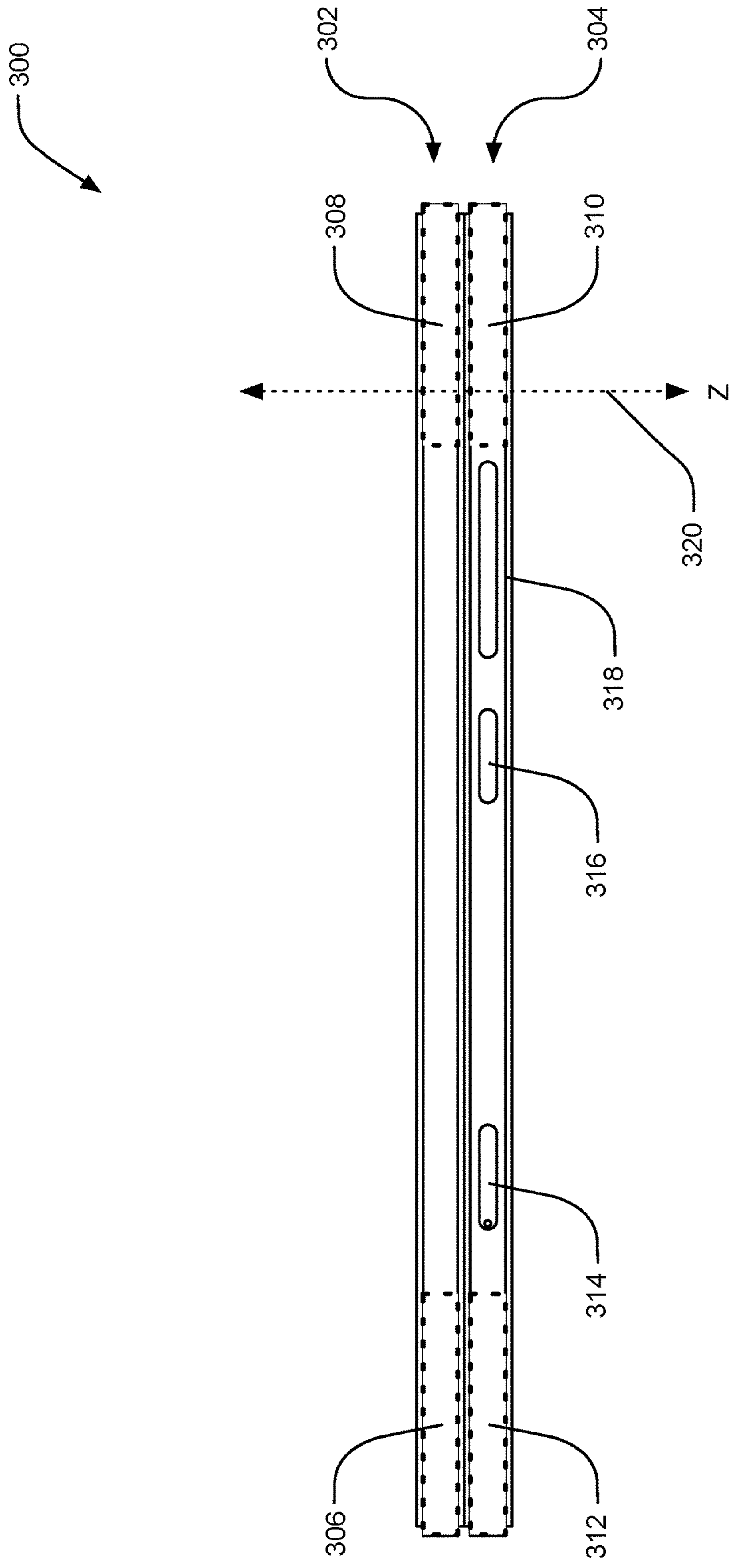
FIG. 3 illustrates a side view of an example foldable communication device.

FIG. 3 illustrates a side view of an example foldable communication device 300. The foldable communication device 300 is folded closed in FIG. 3, although its operation would be essentially the same if it was folded open. The foldable communication device 300 includes a device portion 302 and a device portion 304, although additional device portions are contemplated. The device portion 302 includes two electrically driven antennas 306 and 308 formed in part into the exterior metal chassis of the foldable communication device 300. The device portion 304 includes two capacitively coupled antennas 310 and 312 formed in part into the exterior metal chassis of the foldable communication device 300. The device portion 304 is also shown as including a SIM card slot 314, a power button 316, and a volume toggle switch 318.

While the foldable communication device 300 is folded open or closed, each electrically driven antenna in one device portion is moved into proximity and in a substantially overlapping position along a Z-axis 320 relative to a capacitively coupled antenna in the other device portion. For example, the areas occupied by the antennas 308 and 310 in an X-Y plane overlap along the Z-axis 320 while the foldable communications device 300 is folded closed or folded open. In this physical configuration, an electrically driven antenna can capacitively drive a corresponding/overlapping capacitively coupled antenna, thereby effectively enlarging the electrical aperture of the antenna system in the select frequency band without bridging the hinge with a radio frequency cable. A radio frequency cable is an electrical connector designed to work at radio frequencies in the multi-megahertz range.

In one implementation, the distance between an electrically driven antenna of one device portion and the corresponding capacitively coupled antenna of the other device portion in a folded (open or closed) mode can be within the range of 1-10 mm, although a maximum range of up to about 30 mm would be effective in other implementations. The substantially overlapping relationship between the electrically driven antenna of one device portion and the corresponding capacitively coupled antenna of the other device portion need not be 100% overlapping. In fact, the lengths of the corresponding antennas along the edges of the foldable communication device 300 may differ dramatically. Likewise, some level of misalignment in the overlapping can be tolerated in some configurations. The proximity and overlapping relationships are designed to balance industrial design considerations, the available volume within the foldable communication device, placement of exterior controls and other elements, etc.

Another design parameter that can affect the antenna performance is the antenna keep out or clearance from other device components. An antenna keep out that is small (e.g., less than 1 mm) can negatively impact antenna performance. As such, in some implementations, the antenna keep may be recommended, although not required.

Figure 4:
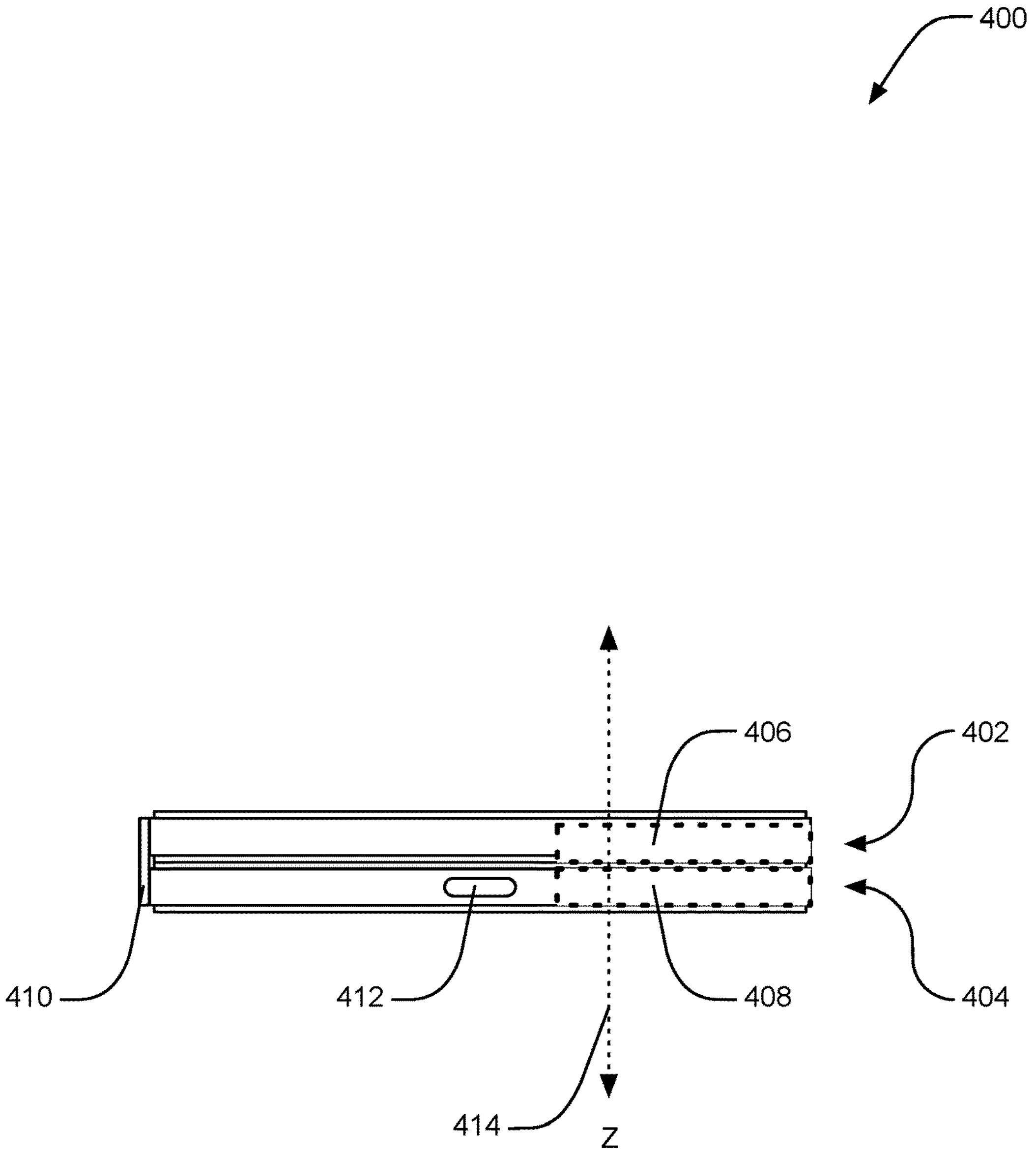
FIG. 4 illustrates a bottom view of an example foldable communication device.

FIG. 4 illustrates a bottom view of an example foldable communication device 400. The foldable communication device 400 is folded closed in FIG. 4, although its operation would be essentially the same if it was folded open. The foldable communication device 400 includes a device portion 402 and a device portion 404, although additional device portions are contemplated. The device portion 402 includes two electrically driven antennas (one is shown as antenna 406) formed at least in part into the exterior metal chassis of the foldable communication device 400. The device portion 404 includes two capacitively coupled antennas (one is shown as antenna 408) formed in part into the exterior metal chassis of the foldable communication device 400. The device portion 402 and the device portion 404 are movably attached by a hinge 410. The bottom of the foldable communication device 400 also shows an external I/O port (e.g., a USB-C port) for an external power supply or communications.

While the foldable communication device 400 is folded open or closed, each electrically driven antenna in one device portion is moved into proximity and in a substantially overlapping position along a Z-axis 414 relative to a capacitively coupled antenna in the other device portion. For example, the areas occupied by the antennas 406 and 408 in an X-Y plane overlap along the Z-axis 414 while the foldable communications device 400 is folded closed or folded open. In this physical configuration, an electrically driven antenna can capacitively drive a corresponding/overlapping capacitively coupled antenna, thereby effectively enlarging the electrical aperture of the antenna system in the select frequency band without bridging the hinge with a radio frequency cable.

Figure 5:
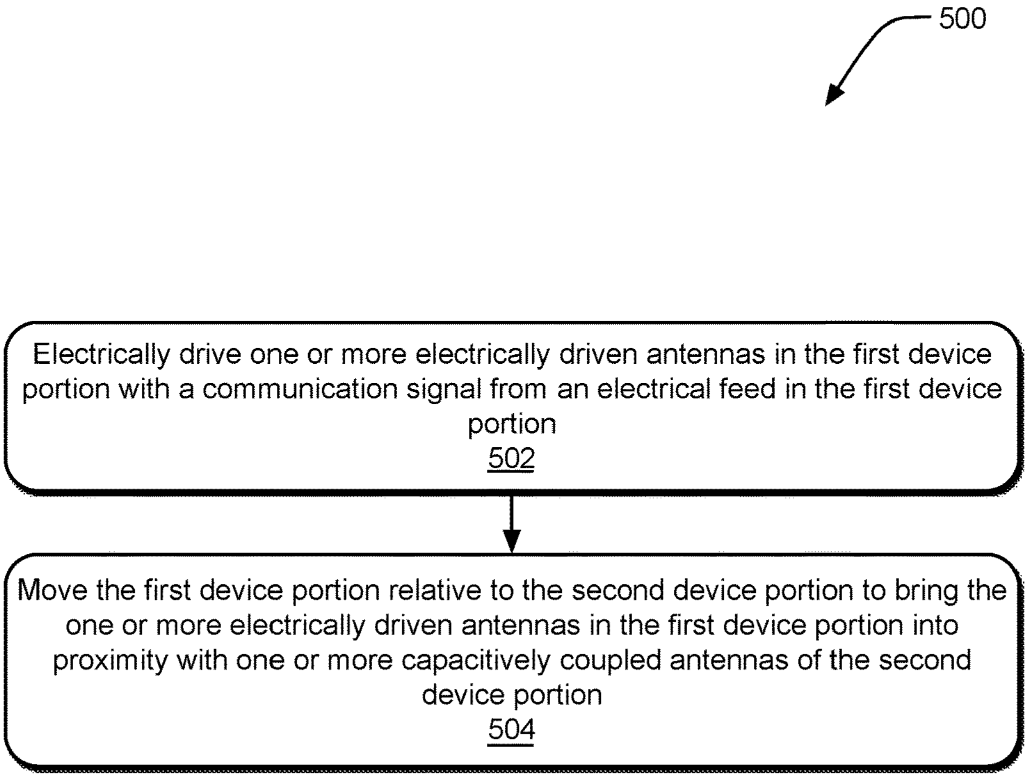
FIG. 5 illustrates example operations for using parasitic antenna coupling in a foldable communication device.

FIG. 5 illustrates example operations 500 for operating a physically configurable communication device, such as a foldable communications device or a slidable communication device. The foldable communications device includes a first device portion and a second device portion. A driving operation 502 electrically drives one or more electrically driven antennas in the first device portion with a communication signal from an electrical feed in the first device portion. The electrically driven antennas are at least partially formed in a conductive chassis (e.g., an exterior metal chassis or case) of the physically configurable communication device.

A movement operation 504 moves the first device portion relative to the second device portion to bring the one or more electrically driven antennas in the first device portion into proximity with one or more capacitively coupled antennas of the second device portion. The capacitively coupled antennas are at least partially formed in the conductive chassis of the physically configurable communication device, wherein each of the electrically driven antennas in the first device portion capacitively drives at least a corresponding one of the capacitively coupled antennas in the second device portion. Examples of moving include folding and sliding the device portions relative to one another, although other types of movement may be employed.

Additional operations may be employed, including without limitation adjusting the impedance of each capacitively coupled antenna to accommodate changes in the physical configuration of the communication device and detecting a change in the physical configuration of the communication device to trigger an impedance adjustment. Such detection may involve gyros, accelerometers, rotational sensors in a hinge, and other sensor or mechanical-based detecting elements. In yet another implementation, such detection may be detected based on the software-detected use contexts of the communication device or combinations of one or more of the above techniques.

FIG. 6 illustrates an example communication device 600 for implementing the features and operations of the described technology. The communication device 600 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The communication device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602.

In an example communication device 600, as shown in FIG. 6, one or more modules or segments, such as applications 650, a tuning application, and other services, workloads, and software/firmware modules, are loaded into the operating system 610 on the memory 604 and/or storage 620 and executed by processor(s) 602. The storage 620 may include one or more tangible storage media devices and may store physical configurations, sensor data, and corresponding tuning parameters, and other data and be local to the communication device 600 or may be remote and communicatively connected to the communication device 600.

The communication device 600 includes a power supply 616, which is powered by one or more batteries or other power sources and which provides power to other components of the communication device 600. The power supply 616 may also be connected to an external power source that overrides or recharges the built-in batteries or other power sources.

The communication device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The communication device 600 may further include a network adapter 636, which is a type of computing device. The communication device 600 may use the adapter and any other types of computing devices for establishing connections over a wide-area network (WAN) or local-area network (LAN). It should be appreciated that the network connections shown are exemplary and that other computing devices and means for establishing a communications link between the communication device 600 and other devices may be used.

The communication device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The communication device 600 may further include a display 622, such as a touch screen display.

The communication device 600 may include a variety of tangible processor-readable storage media and intangible processor-readable communication signals. Tangible processor-readable storage can be embodied by any available media that can be accessed by the communication device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the communication device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example physically configurable communication device having a conductive chassis includes a first device portion including one or more electrically driven antennas at least partially formed in the conductive chassis of the physically configurable communication device and an electrical feed in the first device portion and connected to the one or more electrically driven antennas. The electrical feed is configured to supply a communication signal to the one or more electrically driven antennas. The example physically configurable communication device also includes a second device portion movably attached to the first device portion. The second device portion includes one or more capacitively coupled antennas at least partially formed in the conductive chassis of the physically configurable communication device, wherein each of the electrically driven antennas in the first device portion is configured to capacitively drive at least a corresponding one of the capacitively coupled antennas in the second device portion.

Another example physically configurable communication device of any preceding device is provided, wherein the one or more capacitively coupled antennas of the second device portion are not connected to the electrical feed of the first device portion by a radio frequency cable.

Another example physically configurable communication device of any preceding device further includes a hinge movably attaching the first device portion to the second device portion.

Another example physically configurable communication device of any preceding device is provided, wherein the one or more capacitively coupled antennas of the second device portion are not connected across the hinge to the electrical feed of the first device portion by a radio frequency cable.

Another example physically configurable communication device of any preceding device further includes a slider element movably attaching the first device portion to the second device portion.

Another example physically configurable communication device of any preceding device is provided, wherein each of the electrically driven antennas in the first device portion is configured to capacitively drive at least a corresponding one of the capacitively coupled antennas in the second device portion while the physically configurable communication device is physically configured to bring the electrically driven antennas in the first device portion into proximity with the capacitively coupled antennas in the second device portion.

Another example physically configurable communication device of any preceding device is provided, wherein each of the capacitively coupled antennas in the second device portion is configured to not be capacitively driven by at least a corresponding one of the electrically driven antennas in the first device portion while the physically configurable communication device is physically configured to bring the electrically driven antennas in the first device portion out of proximity with the capacitively coupled antennas in the second device portion.

Another example physically configurable communication device of any preceding device is provided, wherein the conductive chassis forms in part an exterior metal edge of the physically configurable communication device.

Another example physically configurable communication device of any preceding device further includes a variable impedance element electrically connected to each of the at least one of the capacitively coupled antennas, the variable impedance element being configured to tune the at least one of the capacitively coupled antenna among different relative physical configurations between the first device portion and the second device portion.

Another example physically configurable communication device of any preceding device is provided, wherein each of the electrically driven antennas in the first device portion is configured to capacitively drive at least a corresponding one of the capacitively coupled antennas in the second device portion while the electrically driven antenna in the first device portion is physically configured into an overlapping position along a Z-axis relative the corresponding capacitively coupled antenna in the second device portion.

An example method of operating a physically configurable communication device including a first device portion and a second device portion is provided. The physically configurable communication device includes a conductive chassis. The example method includes electrically driving one or more electrically driven antennas in the first device portion with a communication signal from an electrical feed in the first device portion, the one or more electrically driven antennas being at least partially formed in the conductive chassis of the physically configurable communication device and moving the first device portion relative to the second device portion to bring the one or more electrically driven antennas in the first device portion into proximity with one or more capacitively coupled antennas of the second device portion, the one or more capacitively coupled antennas at least partially formed in the conductive chassis of the physically configurable communication device, wherein each of the electrically driven antennas in the first device portion is configured to capacitively drive at least a corresponding one of the capacitively coupled antennas in the second device portion.

An example method of building a physically configurable communication device includes assembling a first device portion including one or more electrically driven antennas at least partially formed in the conductive chassis of the physically configurable communication device and adding an electrical feed in the first device portion and connected to the one or more electrically driven antennas. The electrical feed is configured to supply a communication signal to the one or more electrically driven antennas. The method also includes moveably attaching a second device portion to the first device portion, the second device portion including one or more capacitively coupled antennas at least partially formed in the conductive chassis of the physically configurable communication device, wherein each of the electrically driven antennas in the first device portion is configured to capacitively drive at least a corresponding one of the capacitively coupled antennas in the second device portion.

Another example method of any preceding method is provided, wherein the one or more capacitively coupled antennas of the second device portion are not connected to the electrical feed of the first device portion by a radio frequency cable.

Another example method of any preceding method is provided, wherein the operation of moveably attaching includes movably attaching the first device portion to the second device portion with a hinge, wherein the one or more capacitively coupled antennas of the second device portion are not connected across the hinge to the electrical feed of the first device portion by a radio frequency cable.

Another example method of any preceding method is provided, wherein the conductive chassis forms in part an exterior metal edge of the physically configurable communication device.

An example method of operating a physically configurable communication device including a first device portion and a second device portion, the physically configurable communication device having a conductive chassis is provided. The method includes electrically driving one or more electrically driven antennas in the first device portion with a communication signal from an electrical feed in the first device portion, the one or more electrically driven antennas being at least partially formed in the conductive chassis of the physically configurable communication device and moving the first device portion relative to the second device portion to bring the one or more electrically driven antennas in the first device portion into proximity with one or more capacitively coupled antennas of the second device portion, the one or more capacitively coupled antennas at least partially formed in the conductive chassis of the physically configurable communication device, wherein each of the electrically driven antennas in the first device portion is configured to capacitively drive at least a corresponding one of the capacitively coupled antennas in the second device portion.

Another example method of any preceding method is provided, wherein the one or more capacitively coupled antennas of the second device portion are not connected to the electrical feed of the device first portion by a radio frequency cable.

Another example method of any preceding method is provided, wherein each of the electrically driven antennas in the first device portion is configured to capacitively drive at least a corresponding one of the capacitively coupled antennas in the second device portion while the physically configurable communication device is physically configured to bring the electrically driven antennas in the first device portion into proximity with the capacitively coupled antennas in the second device portion.

Another example method of any preceding method is provided, wherein the conductive chassis forms in part an exterior metal edge of the physically configurable communication device.

Another example method of any preceding method further includes tuning the at least one capacitively coupled antenna via a variable impedance element electrically connected to the capacitively coupled antenna, the variable impedance element varying impedance among different relative physical configurations between the first device portion and the second device portion.

Another example method of any preceding method is provided, wherein each of the electrically driven antennas in the first device portion is configured to capacitively drive at least a corresponding one of the capacitively coupled antennas in the second device portion while the electrically driven antenna in the first device portion is physically configured into an overlapping position along a Z-axis relative the corresponding capacitively coupled antenna in the second device portion.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A physically configurable communication device having a conductive chassis, the physically configurable communication device comprising:

a first device portion including one or more electrically driven antennas at least partially formed in the conductive chassis of the physically configurable communication device;

an electrical feed in the first device portion and connected to the one or more electrically driven antennas, the electrical feed being configured to supply a communication signal to the one or more electrically driven antennas; and a second device portion movably attached to the first device portion, the second device portion including one or more capacitively coupled antennas at least partially formed in the conductive chassis of the physically configurable communication device, wherein each of the one or more electrically driven antennas in the first device portion is configured to capacitively drive at least a corresponding one of the one or more capacitively coupled antennas in the second device portion when the first device portion and the second device portion are closed, each capacitively coupled antenna being configured to enlarge an electrical aperture of the corresponding electrically driven antenna in a select frequency band when the first device portion and the second device portion are closed.

2. The physically configurable communication device of claim 1, wherein the one or more capacitively coupled antennas of the second device portion are not connected to the electrical feed of the first device portion by a radio frequency cable.

3. The physically configurable communication device of claim 1, further comprising:

a hinge movably attaching the first device portion to the second device portion.

4. The physically configurable communication device of claim 3, wherein the one or more capacitively coupled antennas of the second device portion are not connected across the hinge to the electrical feed of the first device portion by a radio frequency cable.

5. The physically configurable communication device of claim 1, further comprising:

a slider element movably attaching the first device portion to the second device portion.

6. The physically configurable communication device of claim 1, wherein each of the one or more electrically driven antennas in the first device portion is configured to capacitively drive at least a corresponding one of the one or more capacitively coupled antennas in the second device portion while the physically configurable communication device is physically configured to bring the one or more electrically driven antennas in the first device portion into proximity with the one or more capacitively coupled antennas in the second device portion.

7. The physically configurable communication device of claim 6, wherein each of the one or more capacitively coupled antennas in the second device portion is configured to not be capacitively driven by at least a corresponding one of the one or more electrically driven antennas in the first device portion while the physically configurable communication device is physically configured to bring the one or more electrically driven antennas in the first device portion out of proximity with the one or more capacitively coupled antennas in the second device portion.

8. The physically configurable communication device of claim 1, wherein the conductive chassis forms in part an exterior metal edge of the physically configurable communication device.

9. The physically configurable communication device of claim 1, further comprising:

a variable impedance element electrically connected to each of the at least one of the one or more capacitively coupled antennas, the variable impedance element being configured to tune the at least one of the one or more capacitively coupled antennas among different relative physical configurations between the first device portion and the second device portion.

10. The physically configurable communication device of claim 1, wherein each of the one or more electrically driven antennas in the first device portion is configured to capacitively drive at least a corresponding one of the one or more capacitively coupled antennas in the second device portion while the electrically driven antenna in the first device portion is physically configured into an overlapping position along a Z-axis relative the corresponding capacitively coupled antenna in the second device portion.

11. A method of building a physically configurable communication device, the method comprising:

assembling a first device portion including one or more electrically driven antennas at least partially formed in a conductive chassis of the physically configurable communication device;

adding an electrical feed in the first device portion and connected to the one or more electrically driven antennas, the electrical feed being configured to supply a communication signal to the one or more electrically driven antennas; and moveably attaching a second device portion to the first device portion, the second device portion including one or more capacitively coupled antennas at least partially formed in the conductive chassis of the physically configurable communication device, wherein each of the one or more electrically driven antennas in the first device portion is configured to capacitively drive at least a corresponding one of the one or more capacitively coupled antennas in the second device portion, when the first device portion and the second device portion are closed, each capacitively coupled antenna being configured to enlarge an electrical aperture of the corresponding electrically driven antenna in a select frequency band when the first device portion and the second device portion are closed.

12. The method of claim 11, wherein the one or more capacitively coupled antennas of the second device portion are not connected to the electrical feed of the first device portion by a radio frequency cable.

13. The method of claim 11, wherein the operation of moveably attaching comprises:

movably attaching the first device portion to the second device portion with a hinge, wherein the one or more capacitively coupled antennas of the second device portion are not connected across the hinge to the electrical feed of the first device portion by a radio frequency cable.

14. The method of claim 11, wherein the conductive chassis forms in part an exterior metal edge of the physically configurable communication device.

15. A method of operating a physically configurable communication device including a first device portion and a second device portion, the physically configurable communication device having a conductive chassis, the method comprising:

electrically driving one or more electrically driven antennas in the first device portion with a communication signal from an electrical feed in the first device portion, the one or more electrically driven antennas being at least partially formed in the conductive chassis of the physically configurable communication device; and moving the first device portion relative to the second device portion to bring the one or more electrically driven antennas in the first device portion into proximity with one or more capacitively coupled antennas of the second device portion, the one or more capacitively coupled antennas at least partially formed in the conductive chassis of the physically configurable communication device, wherein each of the one or more electrically driven antennas in the first device portion is configured to capacitively drive at least a corresponding one of the one or more capacitively coupled antennas in the second device portion, when the first device portion and the second device portion are closed, each capacitively coupled antenna enlarging an electrical aperture of the corresponding electrically driven antenna in a select frequency band when the first device portion and the second device portion are closed.

16. The method of claim 15, wherein the one or more capacitively coupled antennas of the second device portion are not connected to the electrical feed of the first device portion by a radio frequency cable.

17. The method of claim 15, wherein each of the one or more electrically driven antennas in the first device portion is configured to capacitively drive at least a corresponding one of the one or more capacitively coupled antennas in the second device portion while the physically configurable communication device is physically configured to bring the one or more electrically driven antennas in the first device portion into proximity with the one or more capacitively coupled antennas in the second device portion.

18. The method of claim 15, wherein the conductive chassis forms in part an exterior metal edge of the physically configurable communication device.

19. The method of claim 15, further comprising:

tuning the at least one capacitively coupled antenna via a variable impedance element electrically connected to the one or more capacitively coupled antenna, the variable impedance element varying impedance among different relative physical configurations between the first device portion and the second device portion.

20. The method of claim 15, wherein each of the one or more electrically driven antennas in the first device portion is configured to capacitively drive at least a corresponding one of the one or more capacitively coupled antennas in the second device portion while the electrically driven antenna in the first device portion is physically configured into an overlapping position along a Z-axis relative the corresponding capacitively coupled antenna in the second device portion.

21. The physically configurable communication device of claim 1, wherein the one or more capacitively coupled antennas in the second device portion are grounded.

* * * * *